United States Patent [19]

Stanciu

[11] 3,820,753

[45] June 28, 1974

[54] APPARATUS FOR MOLDING CERAMIC CORES AND WAX OR PLASTIC PATTERNS

[75] Inventor: Virgil V. Stanciu, Rocky River, Ohio

[73] Assignee: Tempcraft Tool & Mold, Inc., Cleveland, Ohio

[22] Filed: Dec. 4, 1972

[21] Appl. No.: 311,798

[52] U.S. Cl................. 249/164, 425/176, 425/450
[51] Int. Cl........................................... F16m 11/32
[58] Field of Search ........... 249/160, 161, 163, 164; 425/450, 176

[56] References Cited
UNITED STATES PATENTS

| | | | |
|---|---|---|---|
| 481,952 | 9/1892 | Ingram | 249/160 |
| 671,501 | 4/1901 | Staub | 249/160 |
| 1,467,266 | 9/1923 | De Bats | 249/160 |
| 2,919,470 | 1/1960 | Deters | 259/161 X |

FOREIGN PATENTS OR APPLICATIONS

| 92,664 | 1/1962 | Denmark | 249/164 |
|---|---|---|---|

*Primary Examiner*—Charles W. Lanham
*Assistant Examiner*—Victor A. DiPalma
*Attorney, Agent, or Firm*—Baldwin, Egan, Walling & Fetzer

[57] ABSTRACT

Apparatus is provided for molding ceramic cores and patterns to be used for investment casting blades or vanes for a jet engine, turbine or the like and having such geometry as to provide a strong structure with internal passages permitting the flow of a cooling medium. An essential feature is a mold wherein the positive or negative image of the elongated internal structure is positioned with its longitudinal dimension generally vertical which permits a freedom of design wherein non-parallel surfaces of the image may extend at any angle around a 360° orbit, or inclined upwardly or downwardly, and the mold includes a plurality of pull slides which may be at various levels and, after the image is molded, may be withdrawn outwardly in predetermined sequence as necessary to withdraw each pull slide in a path parallel or normal to the molded surfaces on that portion of the image enclosed by the radially inner end of that individual slide.

6 Claims, 95 Drawing Figures

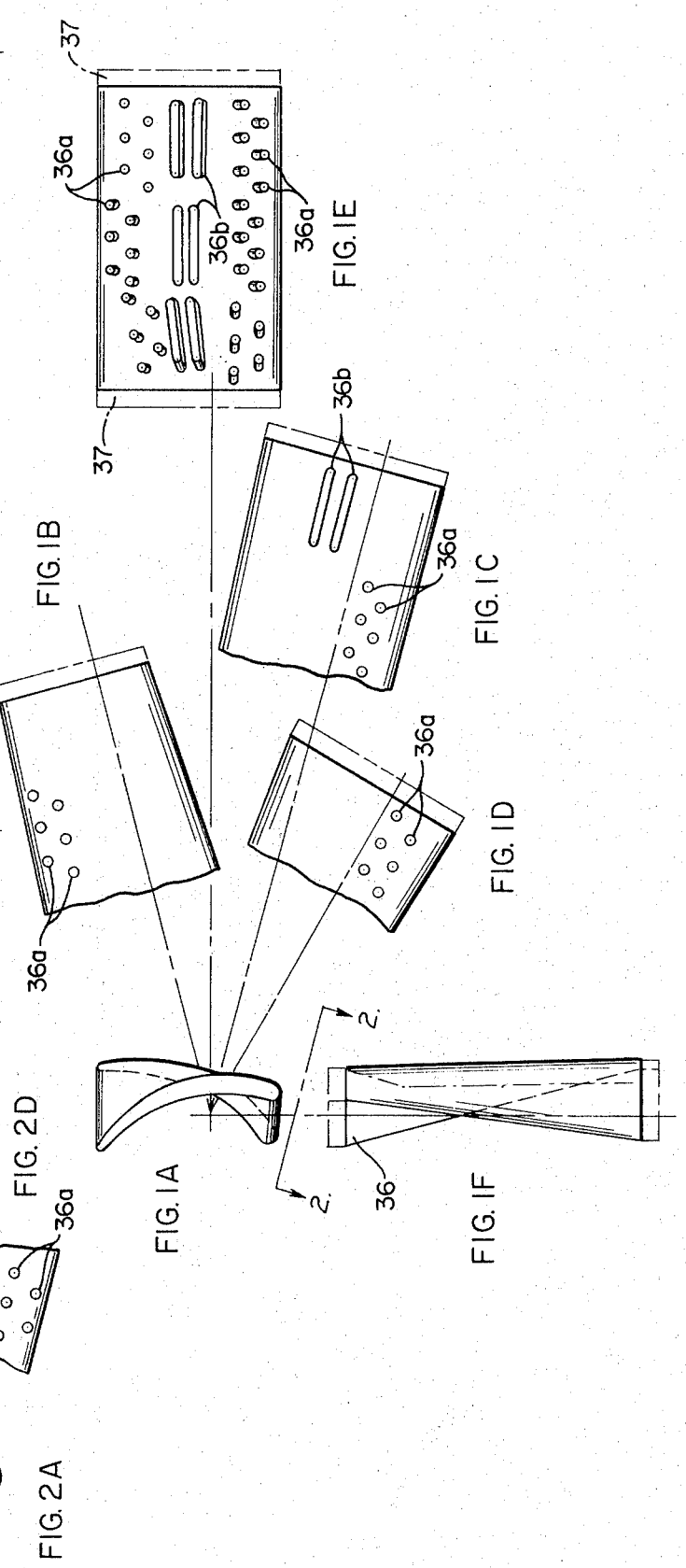

FIG. 3.
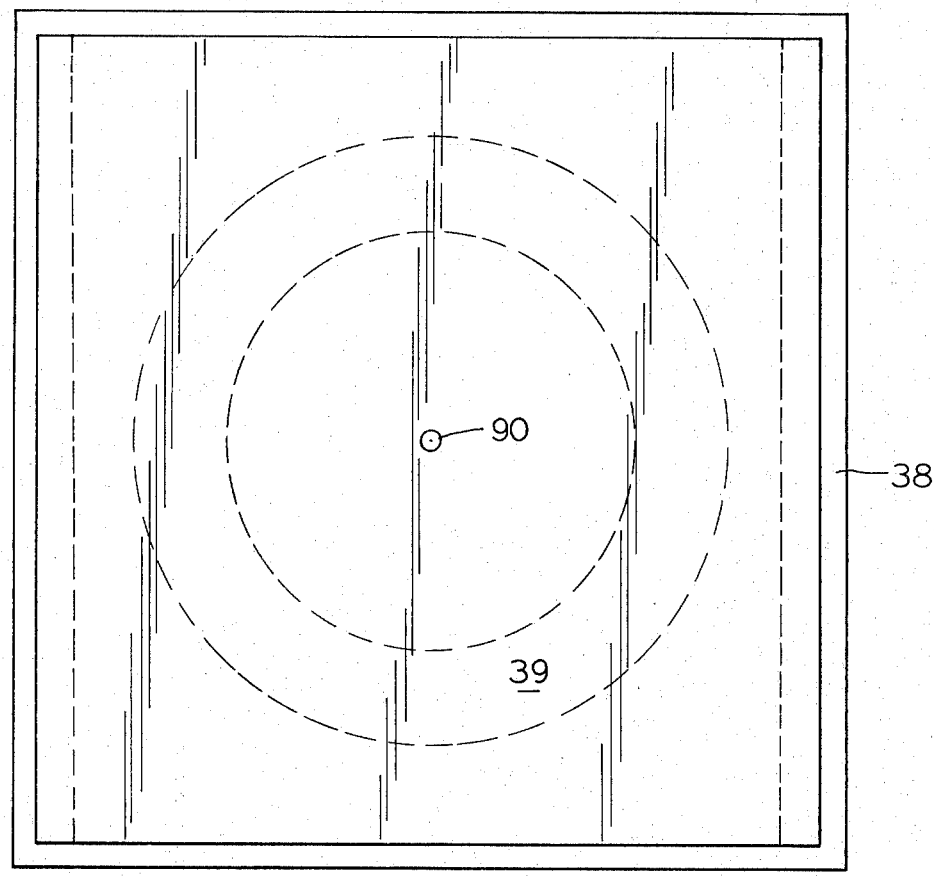
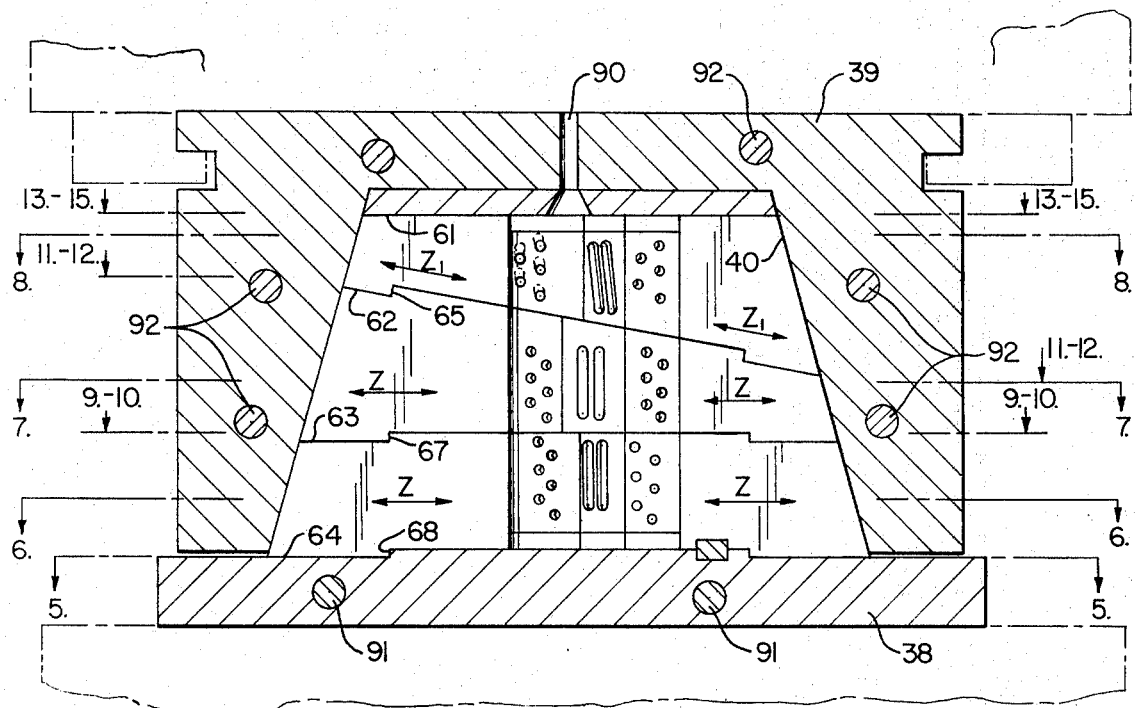
FIG. 4.

PATENTED JUN 28 1974 3,820,753

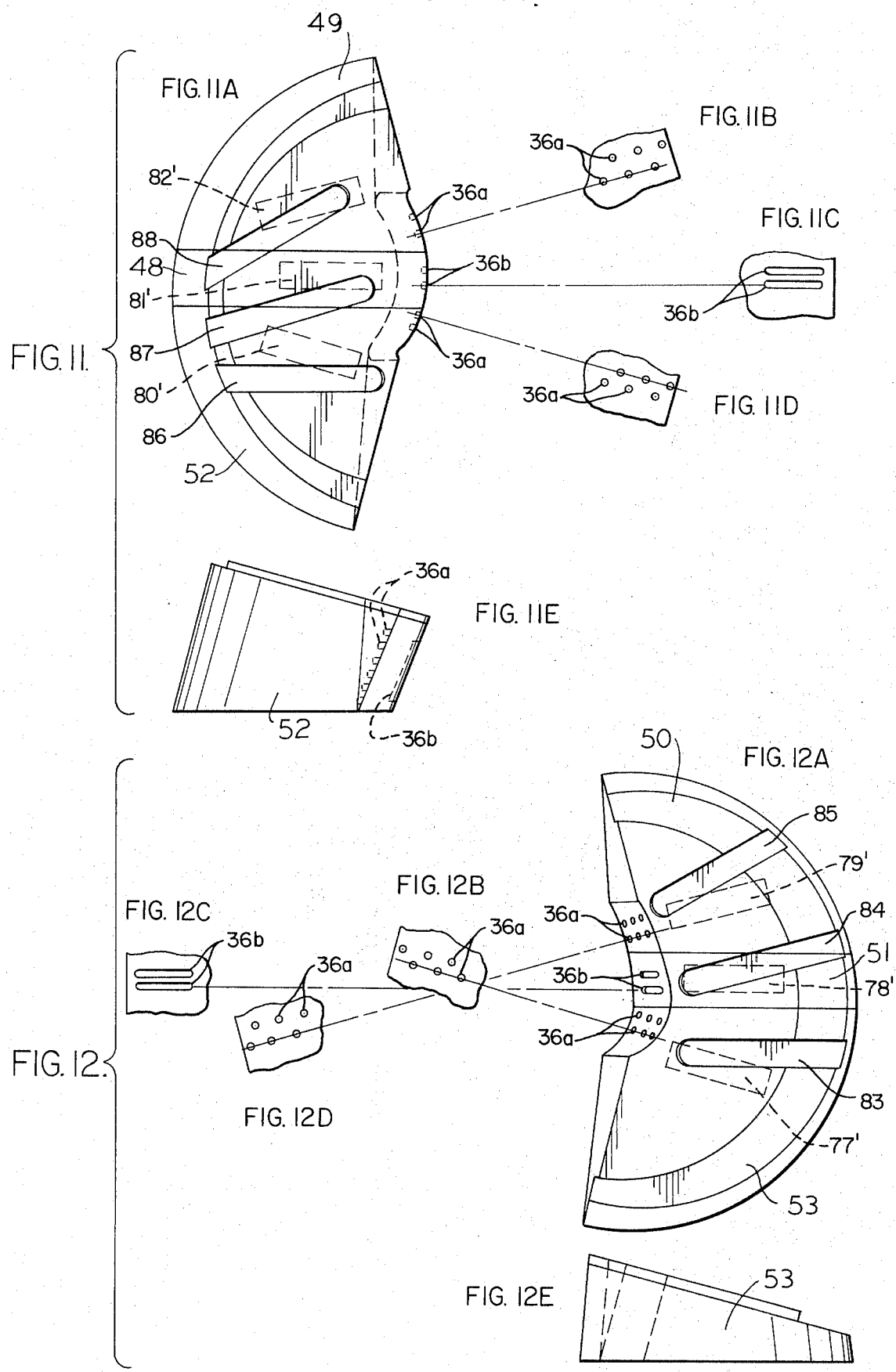

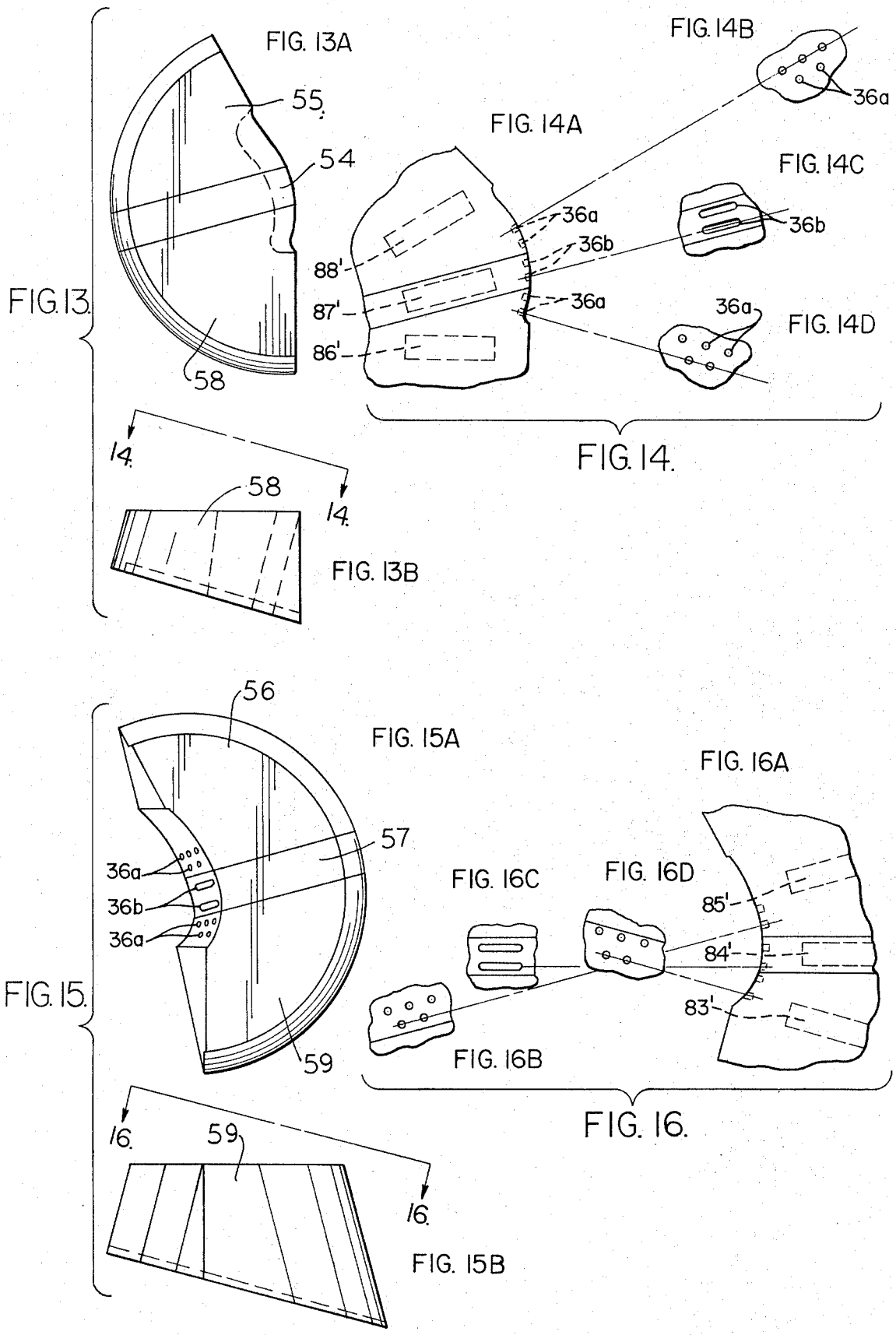

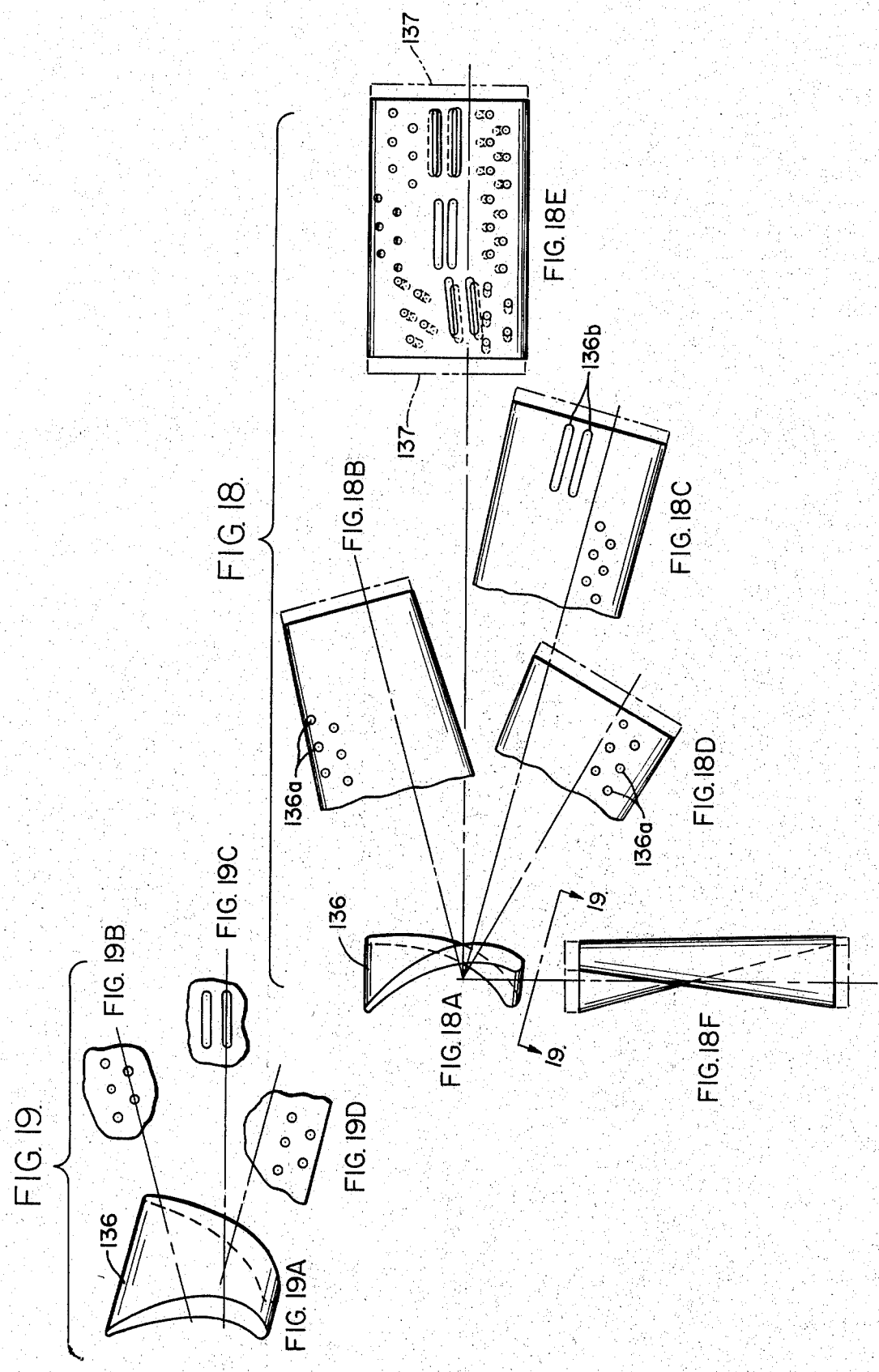

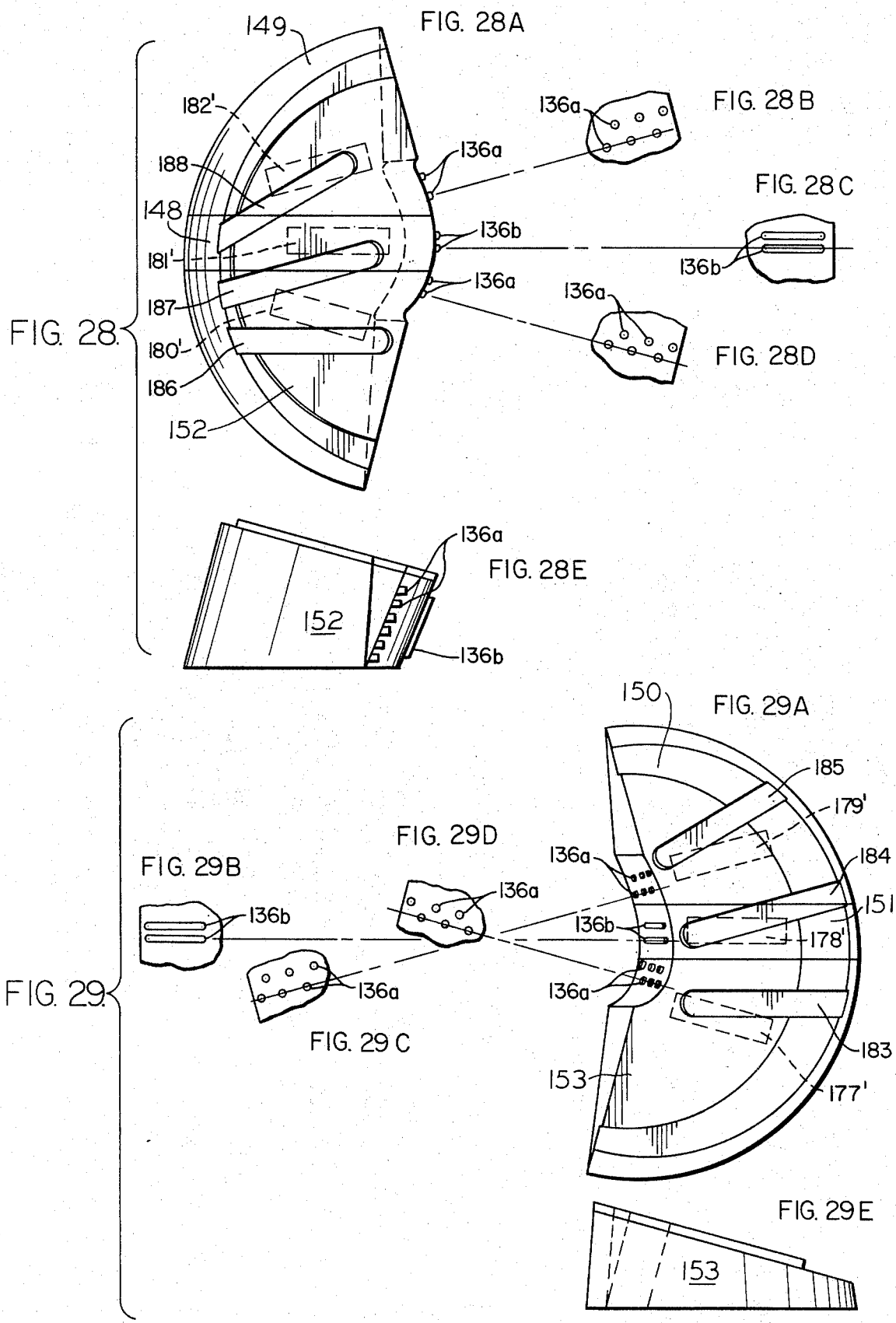

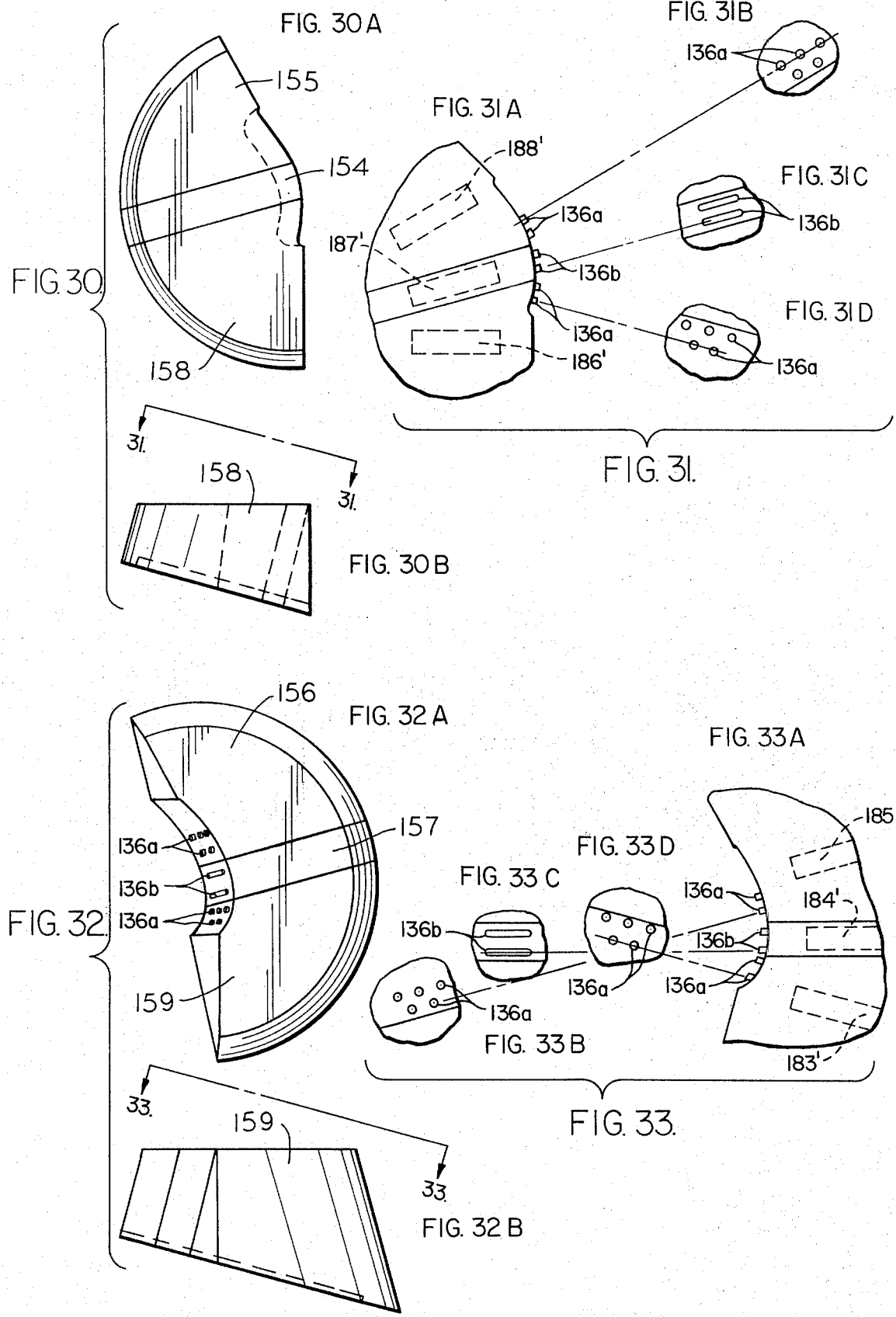

3,820,753

APPARATUS FOR MOLDING CERAMIC CORES AND WAX OR PLASTIC PATTERNS

BACKGROUND OF THE INVENTION

Heretofore cores for providing internal passages in an air foil part such as a blade or vane, or patterns for blades and vanes, of the type under discussion were designed to be molded between upper and lower horizontal platens with all posts or recesses having parallel surfaces normal to the platens, or, if undercut surfaces were designed, extra removable mold pieces had to be provided which called for partial assembly and disassembly of the mold each time a piece was cast. Also, in the case of ceramic molds, the core material struck to the mold, and it had to be disassembled for cleaning every few shots. Previously such undercut surfaces were sometimes formed by hand work on the core.

SPECIFICATION

The object of the present invention is to provide a mold structure for forming an air-foil part such as a blade, a vane, or the like, having shapes heretofore difficult to cast. Such a structure comprises a plurality of pull slides, if necessary at various horizontal levels along the vertical length of a generally vertical mold cavity, and a plurality of such pull slides enclosing said cavity and oriented away from it in a plurality of directions, more than two, so as to be movable generally laterally outwardly along lines parallel to any projections or recesses in the molded surfaces. Some of such pull slides may be movable along paths inclined upwardly or downwardly as they move laterally so as to accommodate inclined molded surfaces.

Another object of the invention is to provide such a multiple-part mold with an outermost frusto-conical shape so that a complementary female frusto-conical bull ring held between two parallel horizontal platens may enclose said mold with high security utilizing less than extremely high clamping forces from the platens.

Another object of the invention is to provide interfitting positioning ring structure between layers of the pull slides at different levels in the mold when completely assembled.

Still another object of the invention is to provide coacting key and slot means between adjacent surfaces of pull slides at different levels in the mold effective to guide each pull slide in a path insuring no disturbance of any portion of the freshly molded form as the mold is opened.

Other objects and advantages of the invention will be apparent from the accompanying drawings and description and the essential features thereof will be set forth in the appended claims.

In the drawings,

FIG. 1 is a composite set of views showing the image of an air foil portion of a blade or vane to be reproduced by the mold of this invention; wherein FIG. 1A is a top plan view of the image, FIGS. 1B, 1C, 1D and 1E are fragmental elevational views of portions of FIG. 1A; and FIG. 1F is a side elevational view of FIG. 1A;

FIG. 2 is a composite view of the same image to be molded wherein FIG. 2A is a top view taken along the line 2—2 of FIG. 1F and FIGS. 2B, 2C and 2D are fragmental elevational views taken of certain portions of FIG. 2A;

FIG. 3 is a top plan view of the assembled mold of this invention;

FIG. 4 is a central sectional view taken approximately through the center of FIG. 3 but showing in section three layers of the mold, these views taken respectively along the lines 4—4 of FIG. 6, FIG. 7 and FIG. 8;

Figure 6:
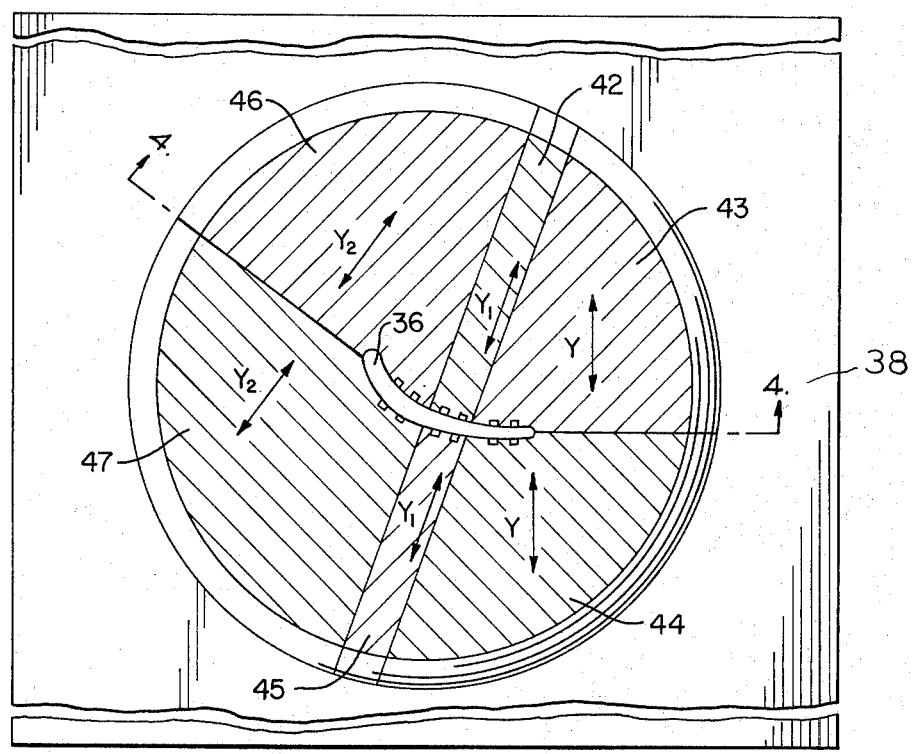
Figure 7:
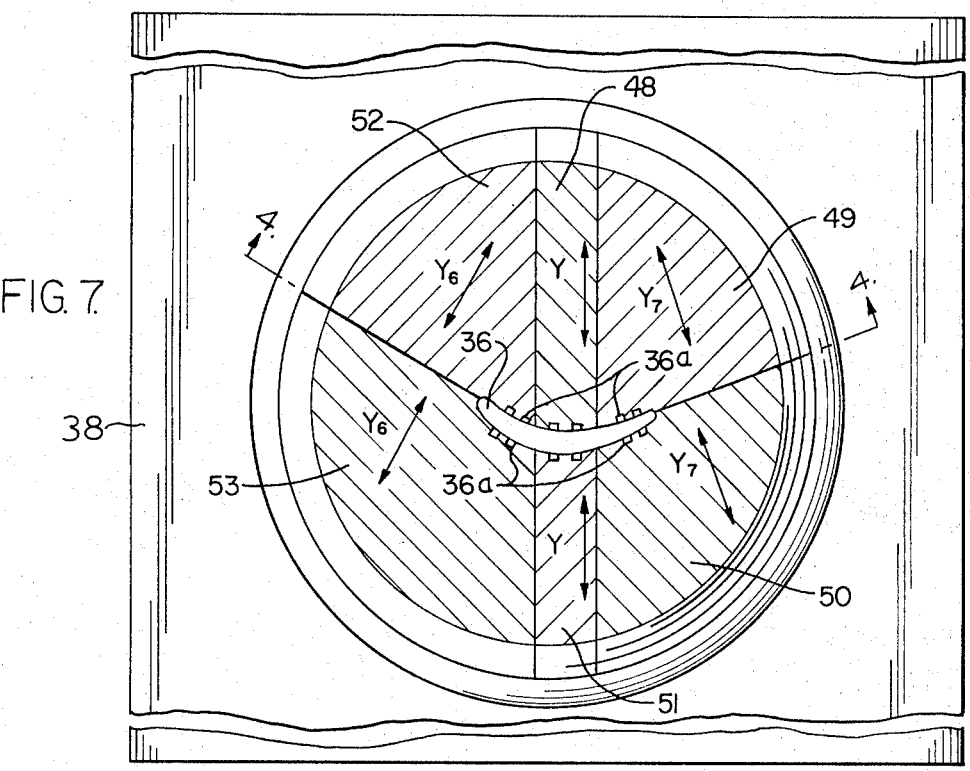
Figure 8:
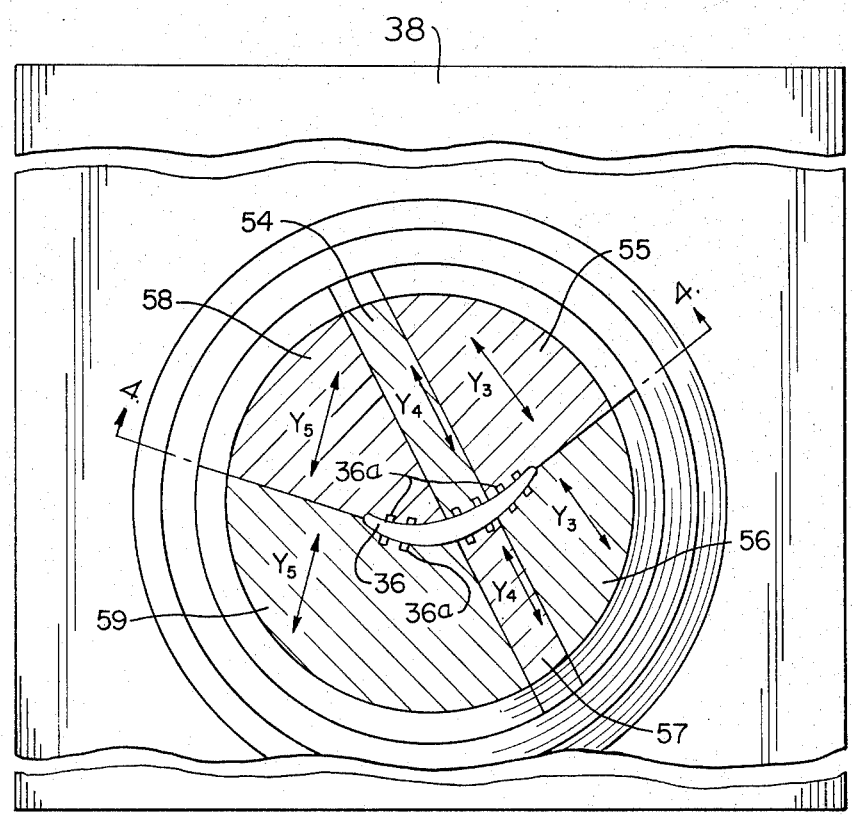
Figure 9:
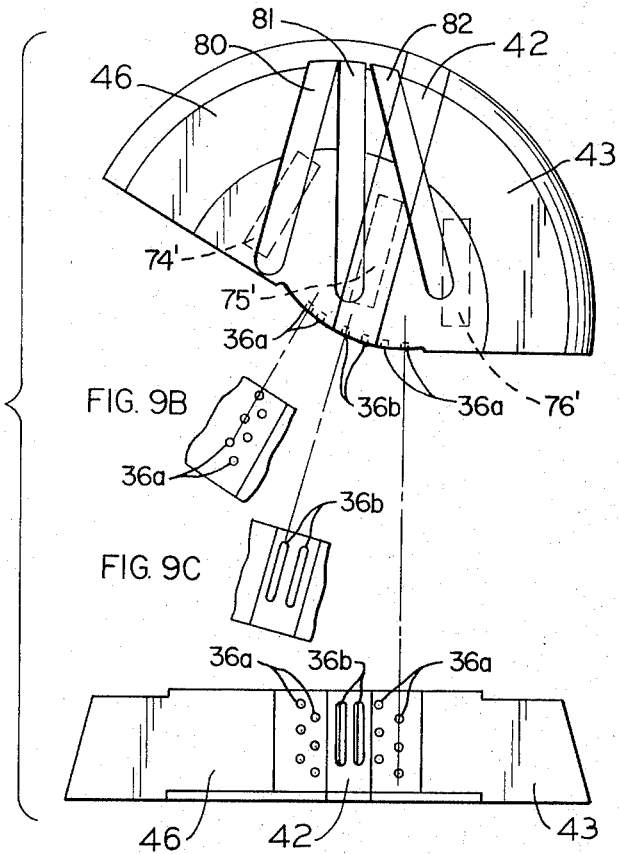
Figure 10:
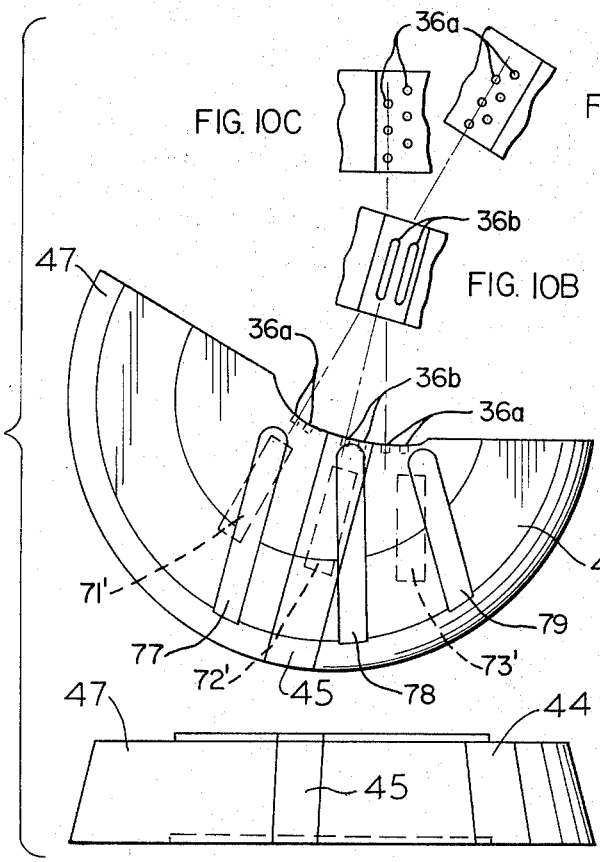
Figure 20:
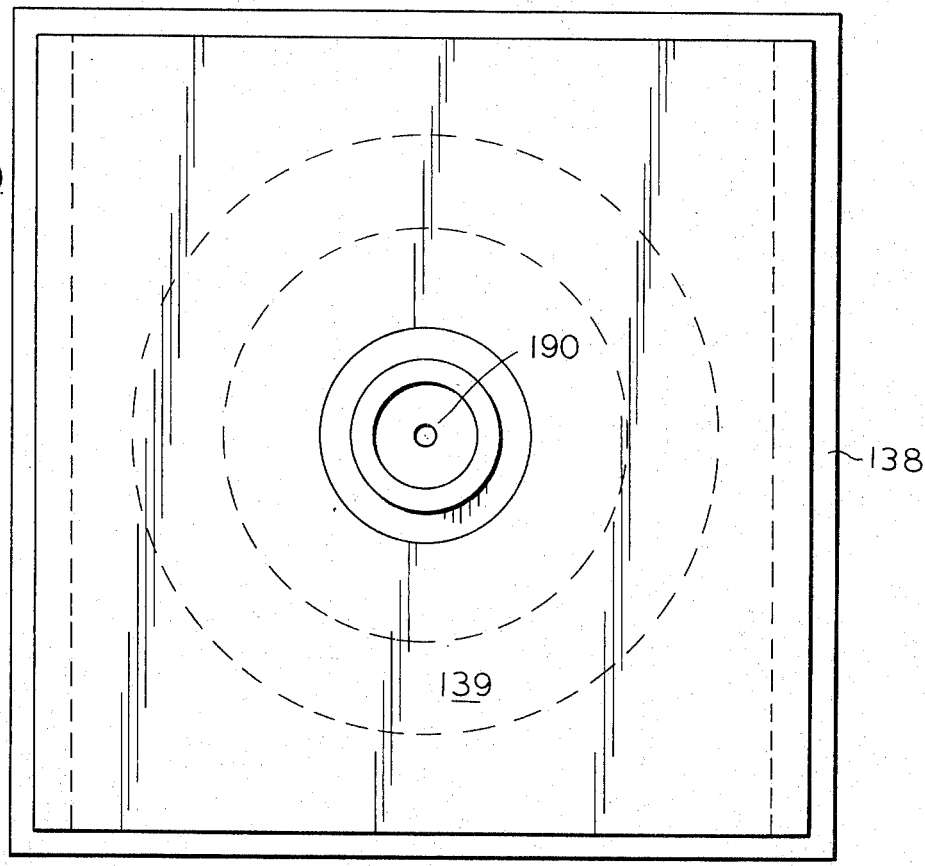
Figure 21:
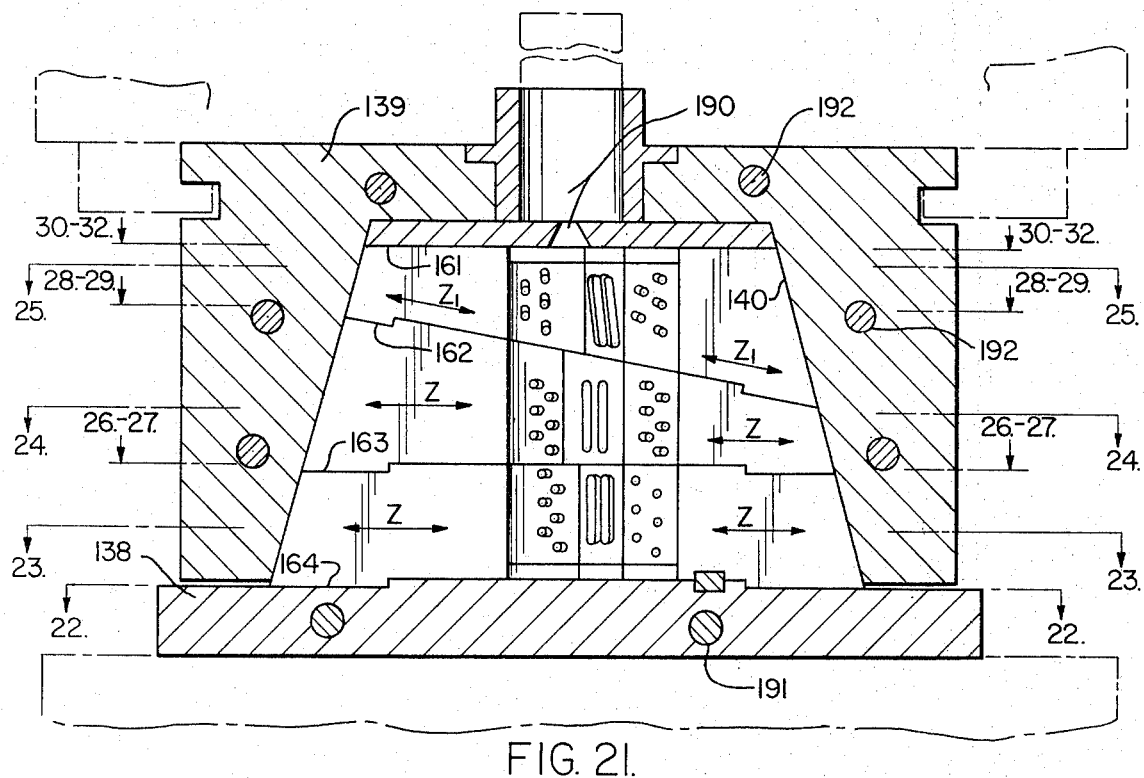
Figure 23:
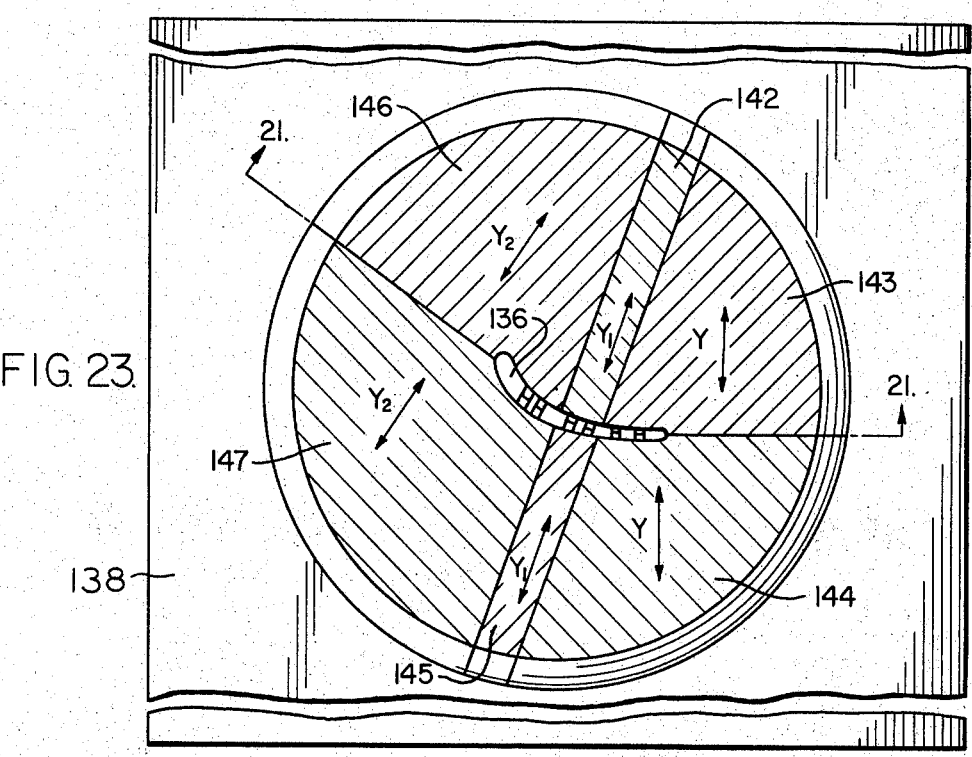
Figure 22:
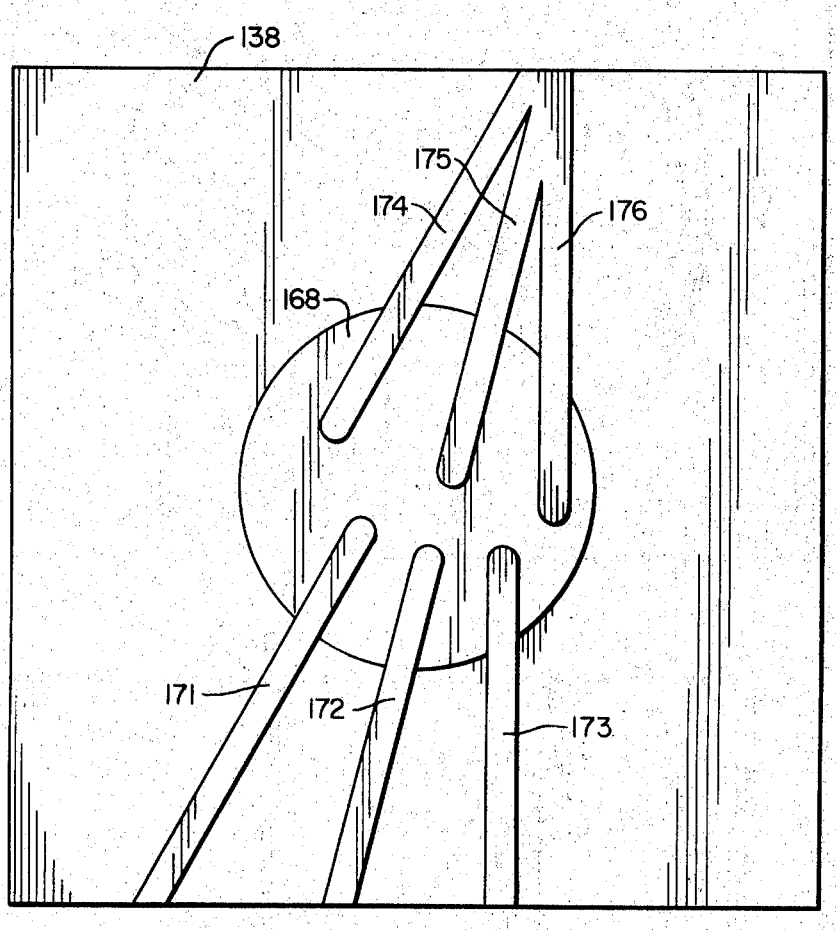
Figure 24:
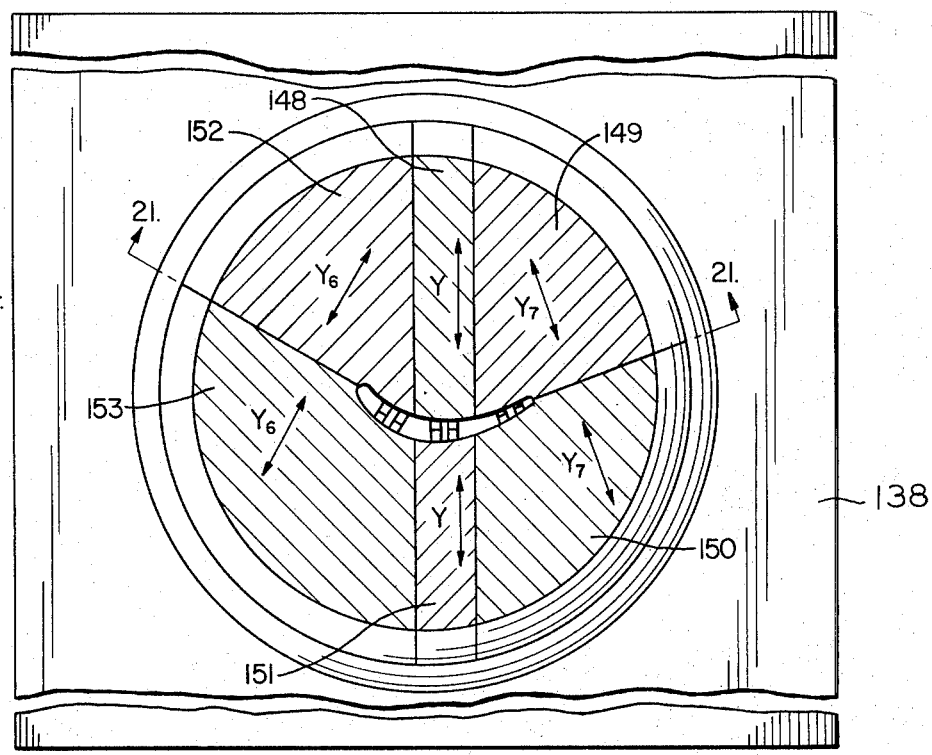
Figure 25:
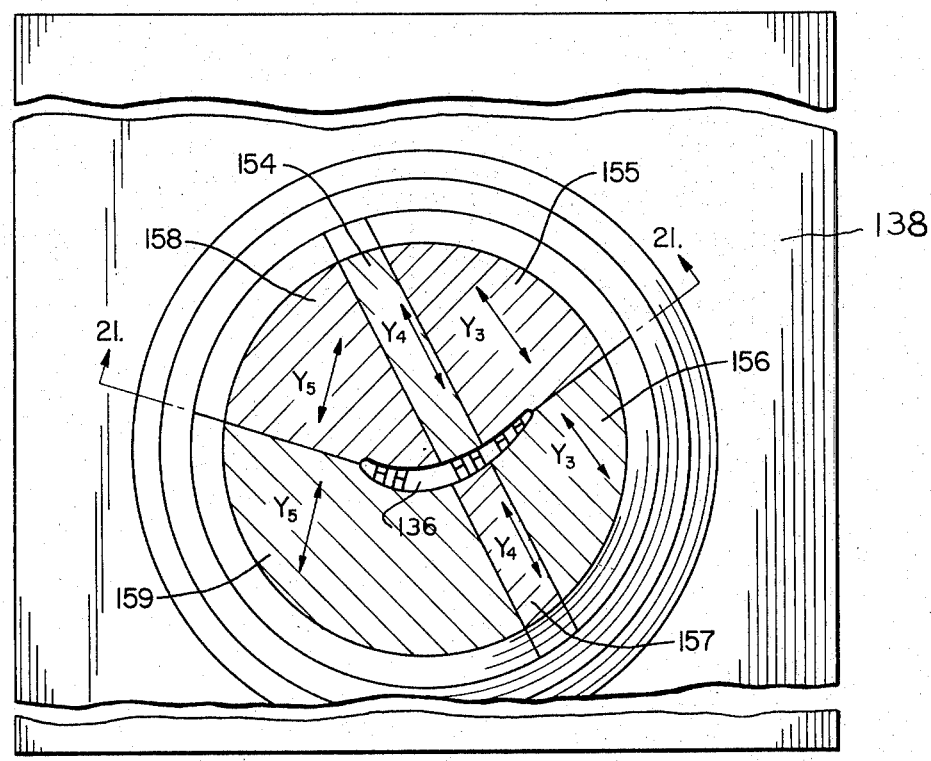
Figure 26:
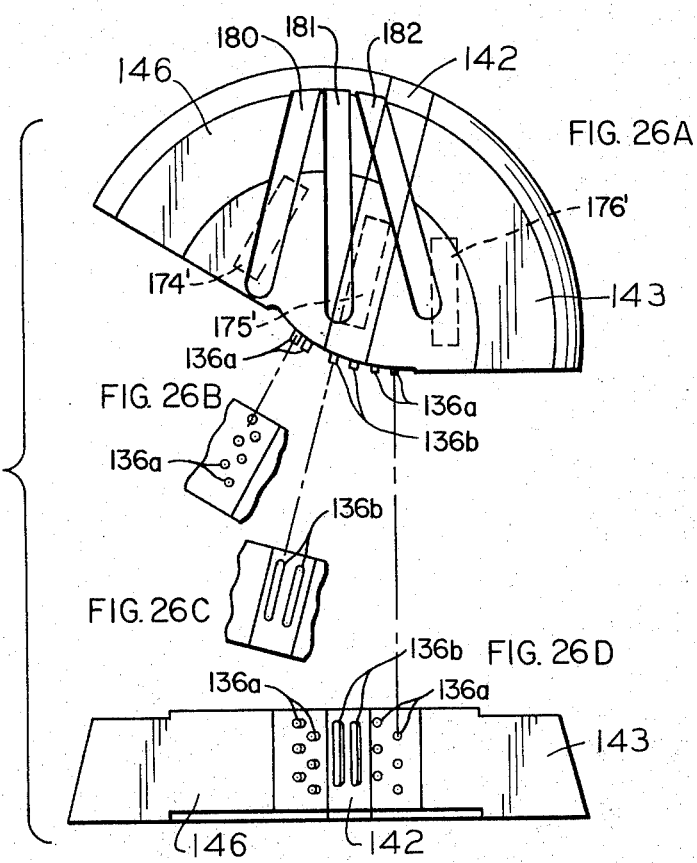
Figure 27:
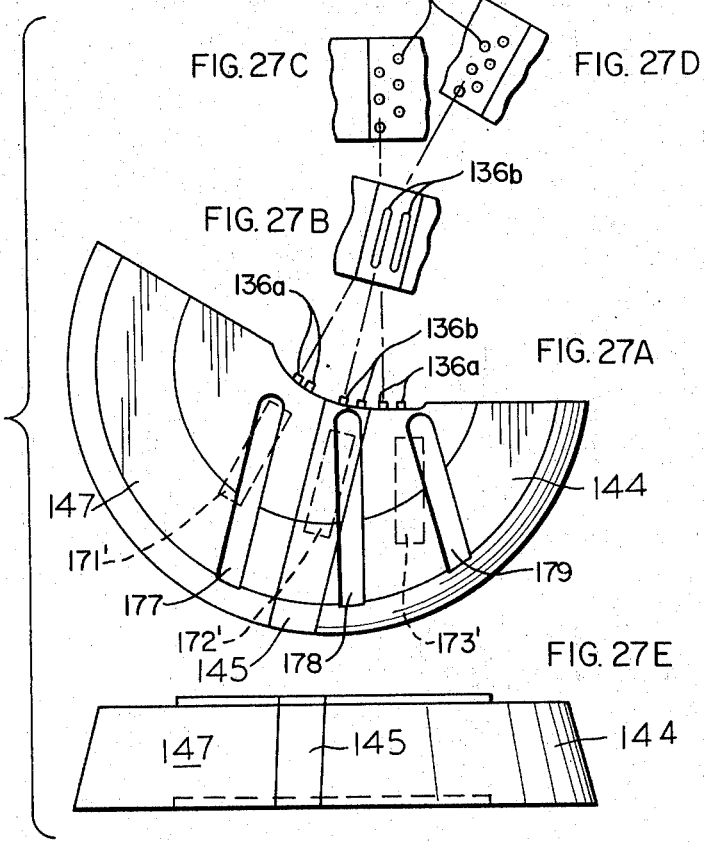

FIGS. 6, 7 and 8 are sectional views taken respectively along the lines 6—6, 7—7 and 8—8 of FIG. 4;

FIGS. 9 and 10 are two composite views of which FIGS. 9A and 10A are plan views of the lower layer of the mold taken along the line 9—10 of FIG. 4. FIGS. 9B and 9C are fragmental elevational views taken along the lower side of FIG. 9A and FIG. 9B is a side elevational view of FIG. 9D;

FIGS. 10B, 10C and 10D are fragmental elevational views of portions of FIG. 10A and FIG. 10E is a side elevational view of FIG. 10A;

FIGS. 11 and 12 are composite views of which FIGS. 11A and 12A are top plan views of the middle mold layer of FIG. 4 and taken approximately along the line 11-12 of FIG. 4;

FIGS. 11B, 11C and 11D are fragmental elevational views of portions of FIG. 11A;

FIG. 11E is a side elevational view of FIG. 11A;

FIGS. 12B, 12C and 12D are fragmental elevational views of portions of FIG. 12A and FIG. 12E is a side elevational view of FIG. 12A;

FIGS. 13 and 15 are composite views of which FIGS. 13A and 15A are substantially top plan views of the top layer of the pull slides seen in FIG. 4 taken generally along the line 13-15, 13-15 of FIG. 4. FIG. 13B is a side elevational view of FIG. 13A;

FIG. 14 is a composite view taken generally along the line 14—14 of FIG. 13B. FIG. 14A is a fragmental top plan view showing the position of certain guiding keys on the lower surface of the pull slides shown in FIGS. 13A and 13B; and FIGS. 14B, 14C and 14D are fragmental elevational views of FIG. 14A;

FIG. 15B is a side elevational view of FIG. 15A;

FIG. 16 is a composite view taken along the line 16—16 of FIG. 15B of which FIG. 16A is a fragmental top plan view of the pull slides shown in FIGS. 15A and 15B showing the location of certain guiding keys on the lower surfaces of the pull slides and FIGS. 16B, 16C and 16D are fragmental elevational views of FIG. 16A;

FIG. 17 is a transverse sectional view through a completed blade or vane assembly utilizing the casting produced by the pattern formed by the apparatus shown in FIGS. 1 through 16;

FIGS. 18 through 23 show how a second embodiment of an internal ceramic core for a blade or vane may be formed by use of the present invention;

FIG. 18 is a composite view of which FIG. 18A is a top plan view of the core image, FIGS. 18B, 18C and 18D and 18E are elevational views of FIG. 18A; and FIG. 18F is a side elevational view of FIG. 18A;

FIG. 19 is a composite view of which FIG. 19A is a plan view taken from the line 19—19 of FIG. 18F, while FIGS. 19B, 19C and 19D are fragmental elevational views of portions of FIG. 19A;

FIG. 20 is a top plan view of the assembled mold of the second embodiment;

FIG. 21 is a sectional view taken generally through the center of FIG. 20 but the views of the three layers of the mold as shown in FIG. 21 are taken respectively along the lines 21—21 of FIGS. 23, 24, and 25;

FIG. 22 is a top plan view of the base of the mold structure seen in FIG. 21 and taken along the line 22—22 of FIG. 21;

FIG. 23 is a sectional view of the bottom layer of pull slides in FIG. 21 taken along the line 23—23 of FIG. 21;

FIG. 24 is a sectional view through the middle layer of pull slides as seen in FIG. 21 and taken along the line 24—24 of FIG. 21;

FIG. 25 is a sectional view taken through the top layer of pull slides as seen in FIG. 21 and is taken along the line 25—25 of FIG. 21;

FIGS. 26 and 27 are composite views of which FIGS. 26A and 27A are top plan views taken generally along the line 26–27, 26–27 of FIG. 21;

FIGS. 26B and 26C are fragmental elevational views of FIG. 26A; and FIG. 26D is a side elevational view of FIG. 26A;

FIGS. 27B, 27C and 27D are fragmental elevational views of FIG. 27A, and FIG. 27E is a side elevational view of FIG. 27A; FIGS. 28 and 29 are composite views of which FIG. 28A and FIG. 29A are top plan views of the middle layers of pull slides as seen in FIG. 21 and as taken generally along the line 28–29 of FIG. 21;

FIGS. 28B, 28C and 28D are fragmental elevational views of FIG. 28A; and FIG. 28E is a side elevational view of FIG. 28A;

FIGS. 29B, 29C and 29D are fragmental elevational views of FIG. 29A, and FIG. 29E is a side elevational view of FIG. 29A;

FIGS. 30 and 32 are composite views of which FIGS. 30A and 32A are top plan views of the top layer of pull slides seen in FIG. 21 and taken generally along the line 30–32, 30–32 of FIG. 21;

FIG. 30B is a side elevational view of FIG. 30A;

FIG. 31 is a composite view of which FIG. 31A is taken along the line 31—31 of FIG. 30B. FIG. 31A shows in dotted lines the position of certain guiding keys which are found on the lower surface of the pull slides shown in FIGS. 30A and 30B. FIGS. 31B, 31C and 31D are fragmental elevational views of FIG. 31A;

FIG. 32B is a side elevational view of FIG. 32A;

FIG. 33 is a composite view taken along the line 33—33 of FIG. 32B and in which FIG. 33A is a fragmental plan view of FIG. 32B indicating the location in dotted lines of three guiding keys found on the lower surface of the pull slides shown in FIG. 32A and FIG. 32B. FIGS. 33B, 33C and 33D are fragmental elevational views of portions of FIG. 33A.

It should be understood that two random embodiments of this invention have been selected for the purpose of describing the invention involved. The turbine designer often requires that ribs, pedestals, nibs, fins and the like be placed in the core passage of the casting for a blade, vane, turbine wheel or the like. This is required in order to increase the thermal efficiency and strength of the castings. Heretofore, in order to place ribs, fins, pedestals, etc., in different planes relative to each other, a complicated die was required with pull slides restricted by the platens of the press where using the usual two-half die. The present invention overcomes this disability of the prior art by placing the core image vertical which is conducive to multiple pull slides being able to move in all directions. Moreover, complicated traction mechanisms for the slides are not necessary since restrictions by the platens of the press do not exist. Thus, the cost of the die can be minimized. Those skilled in the art will understand that each different blade design and its accompanying core will require the application of this invention to the particular problem. This specification will therefore set forth the principles of design necessary to use this invention. The description intends to focus upon various problems that are or may be encountered and will show in the first embodiment the formation of a core utilizing a positive embodiment of the core structure, while the second embodiment will discuss the formation of a core structure involving a negative embodiment of the core structure.

The first embodiment discussed in connection with FIGS. 1 through 17 shows the steps for forming the core 35 indicated in that stage of its construction where it is about to be embodied in a finished blade. The core image 36 is shown in FIGS. 1 and 2 as having portions near one end of the blade lying in different planes from those at the opposite end thereof. The blade might also vary from the generally straight line arrangement of FIG. 1F to involve an inclined portion, say in the middle portion of the blade, to take the shape shown in dot-dash lines in that Figure. This is one of the problems which the present invention provides means for solving. Certain positive projections such as the nibs or pedestals 36a and the ribs 36b are used to represent any desirable positive projections. The usual core prints 37 are shown at opposite ends of the core image. As best seen in FIG. 4, a base plate 38 is shown which may be mounted to the bottom platen of a press as indicated in dot-dash lines and a bull ring 39 having a frusto-conical cavity 40 may be mounted to the top platen of the press as indicated in dot-dash lines.

Beginning at the bottom of the mold, as seen in FIGS. 4 and 6, pull slides 42 and 45 having generally vertical parallel sides are slidable in directions indicated by the arrows Y1 and Z.

The pull slides 43 and 44 are movable in the direction of the arrows Y AND Z. The pull slides 46 and 47 are movable in the direction of the arrows Y2 and Z. All of these pieces enumerated in connection with FIG. 6 lie between the planes generally indicated by lines 63 and 64 in FIG. 4.

Referring to FIGS. 4 and 7, the pull slides shown in the middle layer of the mold are as follows. Slides 48 and 51 move in the direction of the arrows Y and Z. Slides 49 and 50 slide in the direction of the arrows Y7 and Z. The slides 52 and 53 slide in the direction of the arrows Y6 and Z. The inner ends of these slides completely enclose the core image 36. They carry recesses 360 of a size and in such position as to form the required projections 36a and 36b on the core. All of the slides indicated in FIG. 7 terminate generally along the planes indicated by lines 62 and 63 in FIG. 4.

Referring to FIGS. 4 and 8, the pull slides in the top layer of the mold are as follows. Slides 54 and 57 move in the direction of the arrows Y4 and Z1. Slides 55 and 56 move in the direction of the arrows Y3 and Z1. Slides 58 and 59 move in the direction of the arrows Y5 and Z1. The inner ends of all of these slides in FIG. 8 completely enclose the core image 36 at the top level of the mold. The slides contain recesses at their inner ends 360 suitable for forming the previously mentioned projections 36a and 36b. All of the slides of FIG. 8 lie generally between the lines 61 and 62 of FIG. 4. It will be noted that the sloping division line 62 between the top and middle layers of the mold slides in FIG. 4 make it possible to accommodate a core image inclined relative to the vertical as indicated in dot-dash lines in FIG. 1F.

It will be noted that locating diameters 65, 67 and 68 are provided respectively between the top and middle layers of pull slides, between the middle layer and the bottom layer of the pull slides, and between the bottom layer of pull slides and the base 38.

Figure 5:
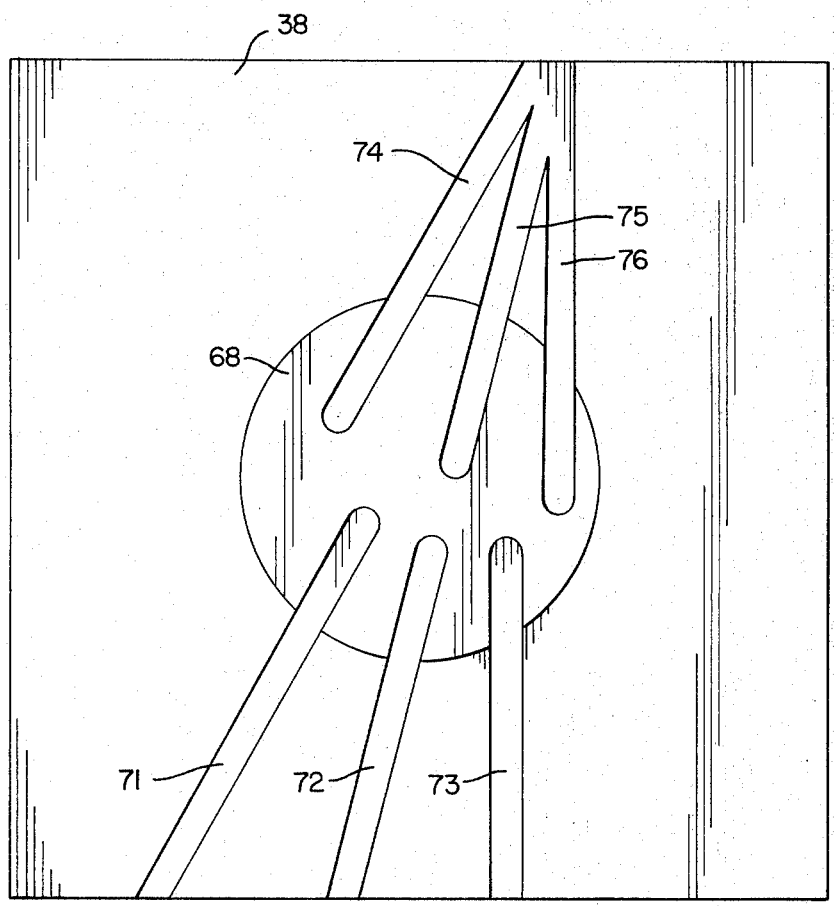
FIG. 5 is a plan view of the base of the mold and is taken along the line 5—5 of FIG. 4.

Means is provided for guiding the movement of the pull slides in the directions indicated in FIGS. 6, 7 and 8. Linear keyways or slots 71 through 76 on the upper surface of the base 38, as shown in FIG. 5, coact with keys 71' through 76', respectively, formed on the lower surfaces of the pull slides 42 through 47 described in connection with FIG. 6. Keyways 77 through 82 formed on the upper surface of the pull slides of the bottom layer, as seen in FIGS. 9A and 10A, coact with keys 77' through 82', respectively, on the lower sides of the slides 48 through 53 as shown in FIGS. 11A and 12A. Keyways 83 through 88 formed on the upper surface of the pull slides in the middle layer of the mold as shown in FIGS. 11A and 12A coact with keys 83' through 88', respectively, formed on the lower surfaces of the pull slides shown in the uppermost layer of the mold in FIG. 4 and as indicated in FIGS. 14A and 16A. The purpose of all of these interlocking keys and keyways is to compel movement of the pull slides in the proper direction when they are moved laterally outwardly to release a newly formed mold image.

In use, the mold is assembled with the slides in the position shown in FIGS. 4, 6, 7 and 8 and resting upon the base 38. The upper platen is then moved downwardly so that the female frusto-conical recess 40 in the bull ring 39 closely embraces the assembled mold pieces which have a male frusto-conical outer surface.

Suitable clamping forces are applied by the platens above and below the assembled mold and then the central cavity thereof is filled with suitable core material under pressure. In this case, a gate 90 is provided in the top of the bull ring communicating with the central cavity of the mold for transfer molding. It should be understood, however, that injection molding may be used, in which case a passageway is provided in the base 38 communicating with the central cavity. In this particular embodiment, the core material introduced to the mold cavity is either investment wax or a thermoplastic synthetic material.

The openings indicated at 91 in the base plate and at various points 92 in the bull ring are for the insertion of heating elements.

When the molded core has cooled sufficiently, introduction of molding material is interrupted and the top plates with the bull ring 39 moves up. The operator then removes the pull slides in the following manner:

A. Slides 54 and 57 in direction Y4, Z1.
B. Slides 55 and 56 in direction Y3, Z1.
C. Slides 58 and 59 in direction Y5, Z1.
D. Slides 48 and 51 in direction Y, Z.
E. Slides 49 and 50 in direction Y7, Z.
F. Slides 52 and 53 in direction Y6, Z.
G. Slides 42 and 45 in direction Y1, Z.
H. Slides 43 and 44 in direction Y, Z.
I. Slide 46 in direction Y2, Z.
K. The molded core form is then removed from slide 47 in direction Y2, Z.

To close the mold for the next operation, the above sequence is reversed after the core has been removed.

This description presumes that the slides are manually operated but they could be spring or mechanically operated, if desired.

An air foil part utilizing the core formed as described hereinabove is then completed in a well known manner. The wax or plastic core is first enclosed in a shell mold in a knowm manner, usually involving a first coat of a ceramic coating containing only very fine ceramic particles, followed by other dip coats of different viscosity and usual containing different grading of ceramic particles. After each dip, coarser stucco material is applied to the still wet coating. This shell mold is then hardened and heated whereby to cause the molten wax or plastic to empty the cavity. Steel or other suitable metal is then cast in the shell mold giving a metal core like that shown at 35 in FIG. 17. In one embodiment this core is made of steel which is first encased in a thin metal skin 35a and then the air foil half blade shells 35b and 35c are placed in the position shown in FIG. 17 and the entire structure is welded into an integral assembly.

The second embodiment shown in FIGS. 18 through 33 shows the steps for forming the core 135 out of ceramic core material, this core eventually controlling the formation of the internal structure of a blade having internal passages. The mold for forming this structure has a plurality of pull slides which closely resemble those described in connection with the first embodiment, the chief difference being that in the first embodiment the inner ends of the pull slides had recesses which formed male projections on the core structure turned out by the mold, whereas this second embodiment has projections on the inner ends of the pull slides which form female structures on the core image turned out by the mold. Otherwise it will be noted that the structures of the mold are quite similar and function in the same way as in the first embodiment and parts will be given the same reference characters with a one hundred digital prefix.

The core image 136 shown in FIGS. 1 and 2 has portions at opposite ends of the blade lying in different planes. Certain negative recesses such as the holes 36a and the slots 36b are used to represent any desirable negative recesses. The usual core prints 137 are shown at opposite ends of the core image. As seen in FIG. 4, base plate 138 may be mounted to the bottom platen of the press and the bull ring 139 having a frusto-conical cavity 140 may be mounted to the top platen of the press.

Beginning at the bottom of the mold and referring to the first layer of pull slides mounted directly upon the base 138, pull slides 142 and 145 having generally vertical parallel sides are slidable in direction of the arrows Y1 and Z. The generally triangular pull slides 146 and 147 are movable in the direction of the arrows Y2 and Z. The generally triangular pull slides 143 and 144 are movable in the direction of the arrows Y and Z. All of these pieces shown in FIG. 6 lie between the planes generally indicated by lines 163 and 164 in FIG. 4.

Referring to FIGS. 4 and 7, the pull slides shown in the middle layer of the mold are as follows. Pull slides 148 and 151 having generally vertical parallel sides are movable in the direction of the arrows Y and Z. Triangular slides 149 and 150 are movable in the direction of the arrows Y7 and Z. Generally triangular slides 152 and 153 are slidable in the direction of the arrows Y6 and Z. All of the slides indicated in FIG. 24 terminate generally along the planes indicated by lines 162 and 163 in FIG. 21.

Referring to FIGS. 21 and 25, the pull slides in the top layer of the mold are as follows. Slides 154 and 157 having generally vertically parallel sides move in the direction of the arrows Y4 and Z1. Slides 155 and 156 being generally triangular move in the direction of arrows Y3 and Z1. Generally triangular slides 158 and 159 move in the direction of the arrows Y5 and Z1. All of the slides shown in FIG. 25 lie generally between the lines 161 and 162 of FIG. 21. It will be noted that the division line 162 between the top and middle layers of the mold slides shown in FIG. 21 makes it possible to accommodate a core image which is inclined relative to the vertical in that part of the core image opposite the pull slides shown in FIG. 25. Obviously, a sloping division zone, as illustrated at 162 might be provided at any desired level in the mold to accommodate a vertically inclined surface of the core image.

As clearly seen in FIGS. 23, 24 and 25, all of the pull slides serve to completely enclose the core image 136. These slides contain projections at the inner ends suitable for forming the previously mentioned recesses 136a and 136b in the molding operation.

It will be noted that there are locating diameters 165, 167 and 168 respectively between the top and middle layers of pull slides, between the middle layer and the bottom layer, and between the bottom layer of pull slides and base 138.

Means is provided for guiding the movement of the pull slides in the directions indicated in FIGS. 23, 24 and 25. Linear keyways or slots 171 through 176 on the upper surface of the base 138, as shown in FIG. 22, coact with keys 171' through 176', respectively, formed on the lower surfaces of the pull slides 142 through 147 described in connection with FIG. 23. Keyways 177 through 182 formed on the upper surface of the pull slides of the bottom layer, as seen in FIGS. 26A and 27A, coact with keys 177' through 182', respectively, on the lower sides of the slides 148 through 153 as shown in FIGS. 28A and 29A. Keyways 183 through 188 formed on the upper surface of the pull slides in the middle layer of the mold as shown in FIGS. 28A and 29A coact with keys 183' through 188', respectively, formed on the lower surfaces of the pull slides shown in the uppermost layer of the mold in FIG. 21 and as indicated in FIG. 25. The purpose of all of these interlocking keys and keyways is to compel movement of the pull slides in the proper direction when they are moved laterally outwardly in a predetermined manner to release a newly formed mold image.

In use, the mold is assembled with the slides in the position shown in FIGS. 21, 23, 24 and 25 and resting upon the base 138. The upper platen is then moved downwardly so that the female frusto-conical recess 140 in the bull ring 139 closely embraces the assembled mold pieces which have a male frusto-conical outer surface.

Suitable clamping forces are applied by the platens above and below the assembled mold and then the central cavity thereof is filled with a suitable ceramic core material under pressure. These core materials are well known in the industry and are nearly always made according to a proprietary formula. In this case, a gate structure 190 is provided in the top of the bull ring communicating with the central cavity of the mold for transfer molding. It should be understood, however, that injection molding may be used, in which case a passageway is provided in the base 138 communicating with the central mold cavity.

The openings indicated at 191 in the base plate and at various points 192 in the bull ring are for the insertion of heating elements.

When the molded core has cooled sufficiently, introduction of molding material is then interrupted and the top platen with the bull ring 139 moves up. The operator then removes the pull slides away from the mold cavity in the following manner:

A. Slides 154 and 157 in direction Y4, Z1.
B. Slides 155 and 156 in direction Y3, Z1.
C. Slides 158 and 159 in direction Y5, Z1.
D. Slides 148 and 151 in direction Y, Z.
E. Slides 149 and 150 in direction Y7, Z.
F. Slides 152 and 153 in direction Y6, Z.
G. Slides 142 and 145 in direction Y1, Z.
H. Slides 143 and 144 in direction Y, Z.
I. Slide 146 in direction Y2, Z.
K. The molded core form is then removed from slide 147 in the direction Y2, Z.

To close the die for the next operation, the above sequence is reversed after the previous core has been removed from the mold.

Standard procedure is then followed to incorporate the ceramic core, as molded above, in an air foil part. A mold having the negative form of the desired air foil part incorporates the ceramic core internally thereof held in the proper position by the core prints 137. Investment wax is then used to fill such mold. When the wax has hardened, the wax form of the blade exterior is then coated with a shell mold in a known manner, usually involving a first coat of a ceramic coating containing only very fine ceramic particles, followed by other dip coats of different viscosity and usually containing different grading of ceramic particles. After each dip, coarser stucco material is applied to the still wet coating. This shell mold is then heated to harden the mold and to melt the wax which is allowed to run out of the shell mold. This provides a mold with an internal cavity like the shape of the desired air foil part with the ceramic core in the proper position in the interior thereof. The air foil-forming metal is then poured into this mold and when the air foil part has solidified, the ceramic core is removed in the usual manner either by vibration or by leaching.

As mentioned in connection with the first embodiment, the pull slides have been here described as manually operated, but they might be spring or mechanically operated, if desired.

This invention provides great freedom of design of internal structure for blades, vanes, turbine wheels and the like not limited as in previous molds confined to two platens between two horizontal planes. The mold of this invention is relatively inexpensive, providing components of the die or mold which are easily cleaned without the necessity of disassembling complicated mechanisms. Also, the area of the mold cavity is projected on the bull ring and, therefore, expensive presses with relatively large clamping forces are not necessary.

Referring to FIGS. 4 and 21, where necessary or desirable heat insulating sheets may be used between the base 38 or 138 and the lower platen, and also between the bull ring 39 or 139 and the upper platen.

What is claimed is:

1. Mold structure for forming a core shape for incorporation in an air foil part, such as a blade, a vane or the like, having its greater dimension extending longitudinally and said air foil part having deformations with surfaces extending in at least two non-parallel planes; comprising a base and multiple pull slides on said base formed to completely enclose said air foil part in a central cavity having its longitudinal dimension generally vertical, said pull slides in assembled position having a male frusto-conical outer surface adapted to coact with a bull ring having a female frusto-conical inner surface complementary to said male frusto-conical surface; said pull slides constructed and arranged to slide laterally, in the absence of said bull ring; the radially inner ends of said slides having formations complementary to said air foil part deformations; said formations having surfaces requiring said slides to be withdrawn laterally, when releasing said molded air foil part, in at least two non-parallel paths to avoid damage to said molded air foil part surface; and coacting guide means on said base and said slides compelling said slides to follow said non-parallel paths.

2. Mold structure as defined in claim 1, including coacting shoulders effective between said base and said slides to locate said slides, when assembled, in said frusto-conical shape.

3. Mold structure as defined in claim 2, wherein said coacting guide means are keys and keyways.

4. Mold structure as defined in claim 1, wherein said pull slides are arranged in a plurality of generally horizontally extending layers defined between generally planar surfaces.

5. Mold structure as defined in claim 4, including concentric interfitting locating shoulder structures on said generally planar surfaces.

6. Mold structure as defined in claim 1, wherein said pull slides are arranged in various vertical levels, and at least some of said pull slides are defined by a surface between them which is so constructed and arranged as to guide said some slides in releasing said molded air foil part without deforming the part.

* * * * *